United States Patent
Larkin (10) Patent No.: US 10,355,979 B2
(45) Date of Patent: Jul. 16, 2019

(54) MEDIA ROUTING

(71) Applicant: Metaswitch Networks Limited, Enfield (GB)

(72) Inventor: Nicholas Peter Larkin, Enfield (GB)

(73) Assignee: Metaswitch Networks Limited, Enfield (GB)

( * ) Notice: Subject to any disclaimer, the term of this patent is extended or adjusted under 35 U.S.C. 154(b) by 325 days.

(21) Appl. No.: 15/163,520

(22) Filed: May 24, 2016

(65) Prior Publication Data
US 2016/0352838 A1    Dec. 1, 2016

(30) Foreign Application Priority Data

May 27, 2015  (GB) .................................. 1509078.0

(51) Int. Cl.
*H04L 12/707* (2013.01)
*H04L 29/06* (2006.01)

(52) U.S. Cl.
CPC .......... *H04L 45/22* (2013.01); *H04L 65/1006* (2013.01)

(58) Field of Classification Search
CPC ..... H04L 65/1006; H04L 12/66; H04L 45/22; H04L 47/18; H04L 67/14

USPC ................................. 709/238, 239, 242, 243
See application file for complete search history.

(56) References Cited

U.S. PATENT DOCUMENTS

| | | | |
|---|---|---|---|
| 2007/0133539 A1* | 6/2007 | Kang | H04L 29/12292 370/392 |
| 2008/0162637 A1* | 7/2008 | Adamczyk | H04L 51/043 709/204 |
| 2011/0131338 A1* | 6/2011 | Hu | H04W 76/11 709/229 |

FOREIGN PATENT DOCUMENTS

WO    WO2008112512    9/2008

* cited by examiner

*Primary Examiner* — Chirag R Patel
*Assistant Examiner* — Marshall M McLeod
(74) *Attorney, Agent, or Firm* — Stetina Brunda Garred & Brucker (57) ABSTRACT

The invention relates to sending media packets, such as SIP or RTP, via a media forwarding element which includes an anycast interface having an address shared with other media forwarding elements. If network topology changes or a media forwarding element becomes unavailable, then anycast messages may be routed to a different media forwarding element sharing the same anycast address. The new media element can then take over handling of the call from the first one.

17 Claims, 3 Drawing Sheets

MEDIA ROUTING

CROSS REFERENCE TO RELATED APPLICATIONS

The present application claims priority to UK Patent Application No. 1509078.0 filed May 27, 2015, the entirety of the disclosure of which is expressly incorporated herein by reference.

STATEMENT RE: FEDERALLY SPONSORED RESEARCH/DEVELOPMENT

Not Applicable.

FIELD OF INVENTION

The present invention relates to the routing of data packets, in particular to the routing of session initiation protocol (SIP) data packets and media data packets. A voice over IP (VoIP) communication channel between two clients may traverse one or more intermediate VoIP media forwarding elements. Such media forwarding elements may include (or be referred to as) RTP proxies, middleboxes, B2BUAs (back-to-back user agents), gateways, media servers, media relays and session border controllers, etc.

BACKGROUND OF INVENTION

In conventional systems, a client wishing to use SIP to establish a call will be configured to contact a SIP server in order to find out the IP address to send media to. This may be the address of a media forwarding element, or it may be the final destination media address of the called party (client). In cases where the communication channel does traverse a media forwarding element, the client sends media packets to that media forwarding element, and the media forwarding element is responsible for forwarding those packets onwards towards the called party. In other words, the session initiation protocol provides the client with the IP address of the media forwarding element that the client should use to conduct a call.

In this way, the client can establish a unicast channel of communication (i.e. messages are sent to a single network destination identified by a unique address) with the media forwarding element. If the media forwarding element is unavailable or becomes unavailable during the course of an exchange of packets with the client, packets to/from the client will not be delivered. This may result in call failure.

Steps may be taken to prevent this, such as making available an alternative media forwarding element which can be used to establish, re-establish, or take over and maintain a call. This could, for example, involve the client being configured to store or obtain the IP address of the alternative media forwarding element so that it can establish a unicast channel of communication with the alternative media forwarding element if the original media forwarding element fails, or causing a SIP signalling element to notify the client, when the first media forwarding element has failed, that the alternative media forwarding element can take over the call. In some implementations, SIP signalling elements and media forwarding elements may be distinct from one another. In other implementations, media forwarding elements may be able to function as SIP signalling elements. If the alternative media forwarding element of the above example is able to function as a SIP signalling element, it may inform the client that it can take over the call.

However, conventional SIP implementations do not provide a mechanism for indicating an alternative media forwarding address ahead of time, i.e. before a first media forwarding element fails. As a consequence, a conventional SIP client may not be able to obtain in advance and store an alternative media forwarding address.

Furthermore, the SIP client may be firewalled to block data packets coming from unknown and/or unapproved IP addresses. Thus an alternative media forwarding element may not be able to notify the SIP client that the alternative media forwarding element can take over the call, or send any media or signalling data to the client, if the alternative media forwarding element has a different IP address from the IP address of the failed media forwarding element. The client would instead need to send a "re-INVITE" request to obtain a new media forwarding address for the call and amend or otherwise overcome its firewall configuration accordingly before it would be able to receive data packets from the alternative media forwarding element. A firewall configuration may be overcome by sending a communication out through the firewall (from the client towards the alternative media forwarding element) and establishing a new association (e.g. a UDP association) between the client and the alternative media forwarding element. These or similar steps might also be necessary to overcome any issues with network address translation (NAT) traversal.

It is therefore difficult to repair a failed SIP call in a timely fashion if different IP addresses are used before and after failure of a media forwarding element. The client would need to detect the failure; re-register with the SIP server/VoIP provider; and send a "re-INVITE" request before it would receive an address for communicating with the alternative media forwarding element. The client would then need to establish a connection with the alternative media forwarding element before the alternative media forwarding element could forward data packets to the client.

Where one media forwarding element fails or becomes unavailable, a large number of clients which were using this element may then need to establish contact with a different media forwarding element. This may lead to an undesirable concentration of traffic over parts of a network, particularly if all the clients in one part of a network are trying to connect to a media forwarding element in a different part of the network, thereby applying additional load to the intervening portions of their network.

The above shows that an alternative media forwarding address can neither be signalled ahead of time nor discovered in response to a failure.

The above-described system utilises unicast addressing where a packet is sent out onto a network destined for a unique IP address. The packet is passed from node to node in an effort to carry the packet to the device associated with that unique IP address. Whilst there are other forms of routing such as multicast (where the originating packet is destined to a set of unique IP addresses) or broadcast (where the packet is transmitted to all possible destinations), these are not appropriate for this kind of communication.

In such a unicast system, a media forwarding element will typically have its own unique IP address. That IP address is not in use by any other elements in the network while the media forwarding element is using the IP address. In the event that the media forwarding element fails, an alternative media forwarding element may assume the unique IP address of the failed media forwarding element and perform media forwarding in the place of the failed media forwarding element. In other words, the unique IP address may be transferred from the failed media forwarding element to the alternative media forwarding element Unicast may therefore be referred to as an "active-standby" model: while the first media forwarding element is active, the second (alternative) media forwarding element is in standby. The second (alternative) media forwarding element becomes active only when the first media forwarding element is unavailable.

There is a further routing technology which is known as anycast, which is sometimes used for service discovery, load balancing and fault recovery. In a network where anycast is deployed, multiple devices may be provided with interfaces having the same IP address. An address such as a DNS name, e.g. sip.server.com, may resolve to this single anycast IP address even though there are multiple instances associated with the IP address. Anycast may therefore be referred to as an "active-active" model: two or more media forwarding elements, for example, may simultaneously use one IP address. The IP address corresponds to the two or more media forwarding elements without uniquely identifying either media forwarding element.

In this way, when a packet is sent to an anycast address, as it is passed from node to node, the node will pass the packet on to the part of the network which it believes will get the packet to the desired address. This will tend to route the packets to the topologically nearest device utilising the anycast IP address. In other words, an effect of using anycast is that user traffic is automatically assigned to nearby server sites. In conjunction with dynamic scaling, the capacity within each site can be adjusted, e.g. in accordance with demand. The packets will tend to be routed to the nearest instance of the anycast address. This will help to balance load as traffic will tend to be routed to the nearest destination having the anycast address rather than having to traverse large distances over the network to get to a server having a specific unicast address.

Similarly, service discovery can be provided using anycast so that a device wishing to identify a service can simply send its request to an anycast address knowing that the actual server receiving the request does not need to be a specific one but rather one that can provide the service discovery. In this way the message will tend to be routed to the nearest device providing the service discovery, which, in addition to the load balancing benefit mentioned above, also helps to minimise the transit time and network bandwidth consumption.

Anycast can also provide a degree of fault recovery in that if one server using the anycast address becomes unavailable, the network will automatically tend to continue to route packets to an alternative server carrying that anycast address.

Overall, the anycast approach can be used to deliver optimal bandwidth usage, minimal network latency, and automatic recovery in the case of network element failure. It can remove the need to maintain large numbers of backup network elements standing idle in case one or more elements fail. Moreover it may allow this to be achieved without firewall and/or NAT traversal issues, since data packets from different network elements using the same anycast address may be permitted through a client firewall that allows data packets from that IP address.

SUMMARY OF INVENTION

According to the present invention, there is provided a media forwarding device for handling media communication sessions, said media forwarding device being arranged to have an associated anycast address which is arranged to be shared with one or more other media forwarding devices and which anycast address is arranged for receiving packets from one or more clients; wherein the media forwarding device includes: a call manager for managing one or more media communication sessions handled by said media forwarding device, wherein the call manager is arranged to: determine if a received packet relates to one of said one or more media communication sessions handled by said media forwarding device; and, if a received packet does not relate to one of said one or more media communication sessions, obtain session information regarding the session corresponding to said received packet and send an update message indicating that said media forwarding device intends to handle the session corresponding to the received packet.

This arrangement of the media forwarding device may allow the media forwarding device to assume responsibility for a session (such as a call) which a different media forwarding device had previously been handling. The arrangement may allow the media forwarding device to do so without interruption of the session. The arrangement may also enable other media forwarding devices to determine or be informed whether they should assume responsibility for the session.

In some embodiments, the call manager of the media forwarding device is further arranged to send a notification to one or more other devices involved in the session corresponding to the received packet. This may ensure that packets from the one or more other devices involved in the session which are intended for a given client device involved in the session are directed to the particular media forwarding device that intends to handle (or is handling) the session, rather than to a different media forwarding device, so that the packets can be forwarded to the intended client device. The notification may for example take the form of a session initiation protocol message.

In some embodiments, the call manager is arranged to update information about said one or more multimedia communication sessions to include said session corresponding to the received packet, if said call manager determines that said received packet does not relate to one of said one or more media communication sessions handled by said media forwarding device. This may ensure that responsibility for the session corresponding to the received packet is assumed by the media forwarding device, and that the session corresponding to the received packet is not interrupted or permanently terminated because a media forwarding device has not assumed responsibility for the session.

In some embodiments, the call manager is arranged to update information about said one or more media communication sessions to include said session corresponding to the received packet, when a period of time has elapsed and during the period of time no other media forwarding device arranged to have the shared anycast address has received a further packet corresponding to the session corresponding to said received packet. This may allow management of contention between different media forwarding devices which could take over the session corresponding to the received packet.

According to the invention there is also provided a system comprising: a plurality of media forwarding devices; and a data store for storing session information about media communication sessions managed by said plurality of media forwarding devices, said data store being arranged to provide session information about one or more of the media communication sessions in response to a request from one of said media forwarding devices and to update the session information in the data store in response to an update message received from one of said media forwarding devices.

According to the invention there is also provided a method for controlling a media forwarding device, said method comprising: managing one or more media communication sessions; receiving packets from one or more clients via an anycast address associated with the media forwarding device, wherein said anycast address is shared with one or more other media forwarding devices; determining if a received packet relates to one of said managed media communication sessions; and, if a received packet does not relate to one of said managed media communication sessions: obtaining session information regarding the session corresponding to said received packet; and sending an update message indicating that said media forwarding device intends to handle the session corresponding to the received packet.

According to the invention there is also provided a computer program for execution by a media forwarding device, said computer program causing the media forwarding device to carry out steps comprising: managing one or more media communication sessions; receiving packets from one or more clients via an anycast address associated with the media forwarding device, wherein said anycast address is shared with one or more other media forwarding devices; determining if a received packet relates to one of said managed media communication sessions; and, if a received packet does not relate to one of said managed media communication sessions: obtaining session information regarding the session corresponding to said received packet; and sending an update message indicating that said media forwarding device intends to handle the session corresponding to the received packet.

According to the invention there is also provided a non-transitory computer-readable storage medium encoded with instructions which, when executed by a processor, enable a media forwarding device to perform steps comprising: managing one or more media communication sessions; receiving packets from one or more clients via an anycast address associated with the media forwarding device, wherein said anycast address is shared with one or more other media forwarding devices; determining if a received packet relates to one of said managed media communication sessions; and, if a received packet does not relate to one of said managed media communication sessions: obtaining session information regarding the session corresponding to said received packet; and sending an update message indicating that said media forwarding device intends to handle the session corresponding to the received packet.

BRIEF DESCRIPTION OF THE DRAWINGS

The present invention will now be described in more detail with reference to a specific example in which.

DETAILED DESCRIPTION

Figure 1:
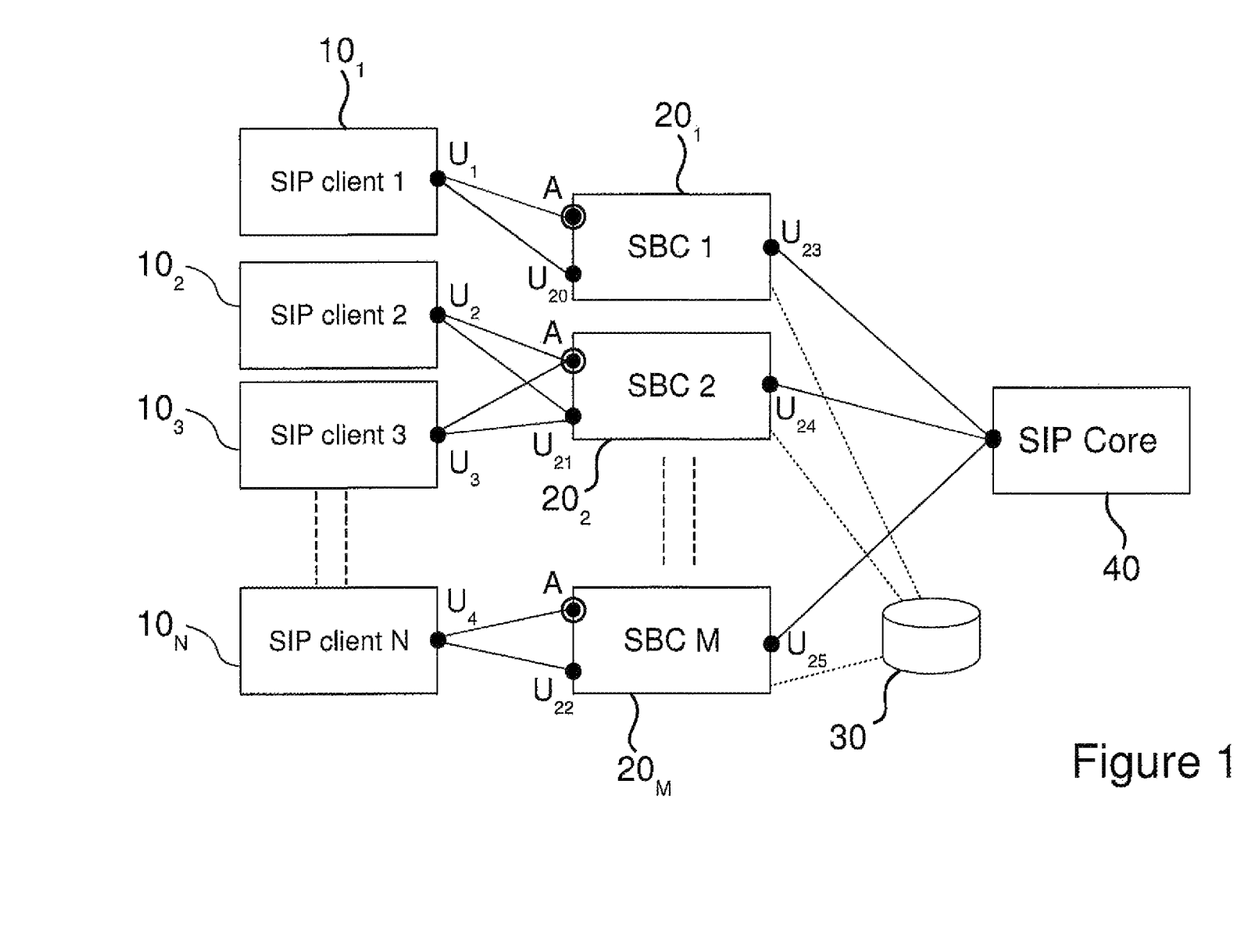
FIG. 1 shows a network using anycast routing in accordance with the present invention.

A typical although simplified portion of a network is shown in FIG. 1. In this embodiment, the media forwarding elements are session border controllers (SBCs). As well as being media forwarding elements, the SBCs also serve as SIP signalling elements. SIP signalling packets and media data packets can be received, sent and/or forwarded by the media forwarding elements. Media data packets may be sent to and/or from the media forwarding elements using the real-time transport protocol (RTP). This may involve the use of the RTP control protocol (RTCP).

This portion of the network includes a number (M) of SBC instances $20_1$-$20_M$ (SBCs) along with a number (N) of SIP clients $10_1$-$10_N$. In the example shown in FIG. 1, SIP client $10_1$ is associated with SBC $20_1$ with the current network topology. Similarly, one or more other SIP clients (not shown) may be associated with SBC $20_1$ although only one is shown in FIG. 1. In FIG. 1, SIP client $10_2$ and SIP client $10_3$ are associated with SBC $20_2$. Again, SBC $20_2$ may be associated with other SIP clients.

These associations can change as the network environment changes, e.g. by new SBC instances becoming available or other ones ceasing to be available. Equally the SIP clients may be on a mobile device which connects to the network in different physical locations such that the most appropriate SBC instance may change with time. Alternatively these relationships may just change because of variations in the network.

The service provider or operator of the network allocates the same anycast address A to all the SBCs $20_1$-$20_M$. Each SBC presents a user-to-network interface (UNI) and a network-to-network interface (NNI). The UNI encompasses protocol communications between SIP clients and the service provider. These protocol communications might be subjected to firewalling. The NNI encompasses protocol communications within the network, e.g. along the service provider VoIP trunking equipment, or VoIP trunking interconnects between different service providers. These protocol communications might not be subjected to firewalling.

The anycast address is used as one of the IP addresses identifying the SBCs $20_1$-$20_M$ on the UNI. In the illustrated example, the anycast address is not used on the NNI. However, in other examples, the anycast address may be used to identify one or more SBCs on the NNI. In the following description, the "client side" is synonymous with "UNI" and the "core side" is synonymous with "NNI".

Each SBC uses the anycast address A on the client side as its RTP local address (i.e. an address which may be used for sending and/or receiving media data packets between a client and the SBC using the real-time transport protocol), and as its SIP UAS address (i.e. the address used when the SBC is on the server as opposed to client side of a given SIP transaction). The SBCs also have one or more unique unicast addresses $U_{20}$, $U_{21}$, $U_{22}$ (on the client side) for other purposes such as for use as a SIP UAC address (i.e. the address used when the SBC is on the client as opposed to server side of a given SIP transaction). The SBCs also have one or more unique unicast addresses $U_{23}$, $U_{24}$, $U_{25}$ (on the core side) used for SIP and RTP communication with the SIP core.

The cluster of SBC instances $20_1$-$20_M$ have a shared repository of data, store 30, which stores shared cluster data about all active calls (e.g. in a memcached store). The store 30 may be stored on one device or on multiple devices, and is arranged such that it can be accessed quickly by the SBC instances. The SBC instances may therefore retrieve any necessary data from the store 30 rather than cache data themselves locally. Alternatively, the SBC instances may cache the data in the store 30 and update their caches by reading from the shared store 30.

The operation of the embodiment of FIG. 1 will now be described in detail. In the arrangement shown in FIG. 1, the SIP client $10_1$ wishes to establish a SIP call to a remote client (not shown). In order to initiate the call, SIP client $10_1$ sends an initial packet e.g. a SIP INVITE directed to the anycast address A associated with the cluster of SBCs $20_1$-$20_M$.

The packet is sent from an interface on the SIP client $10_1$. The interface has a unique IP address $U_1$ associated with it. As indicated above, SIP client $10_1$ is topologically (i.e. in network terms, rather than necessarily in physical or geographic terms) closest to SBC $20_1$ and so the packet is routed to the interface on SBC $20_1$ receiving packets at the anycast IP address, indicated by letter A. SBC $20_1$ then performs its media forwarding function (i.e. processing and forwarding SIP and RTP media packets) in a conventional manner by passing an invite message on to the SIP core 40 and ultimately on to the called party (recipient), to establish the SIP call.

Reply messages from the recipient are routed via the SIP core back to SBC instance $20_1$ and then over the network from SBC $20_1$ to SIP client $10_1$. The message originates from the anycast interface on SBC $20_1$ and is directed to the unicast interface with address $U_1$ on SIP client $10_1$.

Subsequent packets (both SIP set up packets and media packets) are sent from the SIP client $10_1$ in a similar way, with the packets being directed to the anycast address, which will be directed to the SBC $20_1$. Similarly, return packets are also routed back via SBC $20_1$ to SIP client $10_1$. Under normal conditions, packets will flow back and forth between the client and the recipient via SBC $20_1$ until the call ends.

Once the SBC $20_1$ becomes involved in establishing a call e.g. by receiving an INVITE message from a SIP client, it takes ownership of the call. The SBC $20_1$ creates a record representing the call in the shared store 30. The record includes information about the call and indicates that SBC $20_1$ has taken ownership of the call. This information will then be available to other SBCs should it be required, as explained below. The SBC $20_1$ may also maintain a local record (i.e. stored at the SBC $20_1$) of the calls for which it is responsible. The local record of calls for which SBC $20_1$ is responsible may be separate from or part of a cached version of the data stored at the shared store 30. The local record of calls may be updated on a periodic basis or on an ad hoc basis.

In FIG. 1, other SIP clients are shown which similarly use the same anycast address A to send packets. In the case of SIP client $10_2$ and SIP client $10_3$, the topologically nearest SBC is SBC $20_2$. Packets sent out from these SIP clients are therefore routed by the network to SBC $20_2$. Similarly, other SIP clients will use the same anycast address A but packets may be routed to different SBCs depending on their relative location on the network. In FIG. 1, SIP client $10_N$ is shown as having its packets routed to SBC $20_M$.

If there is some change in the network, such as a link failure or some other topology change, or if an SBC ceases to be available, perhaps because it goes offline, then calls may no longer be routable over their initial path.

Figure 2:
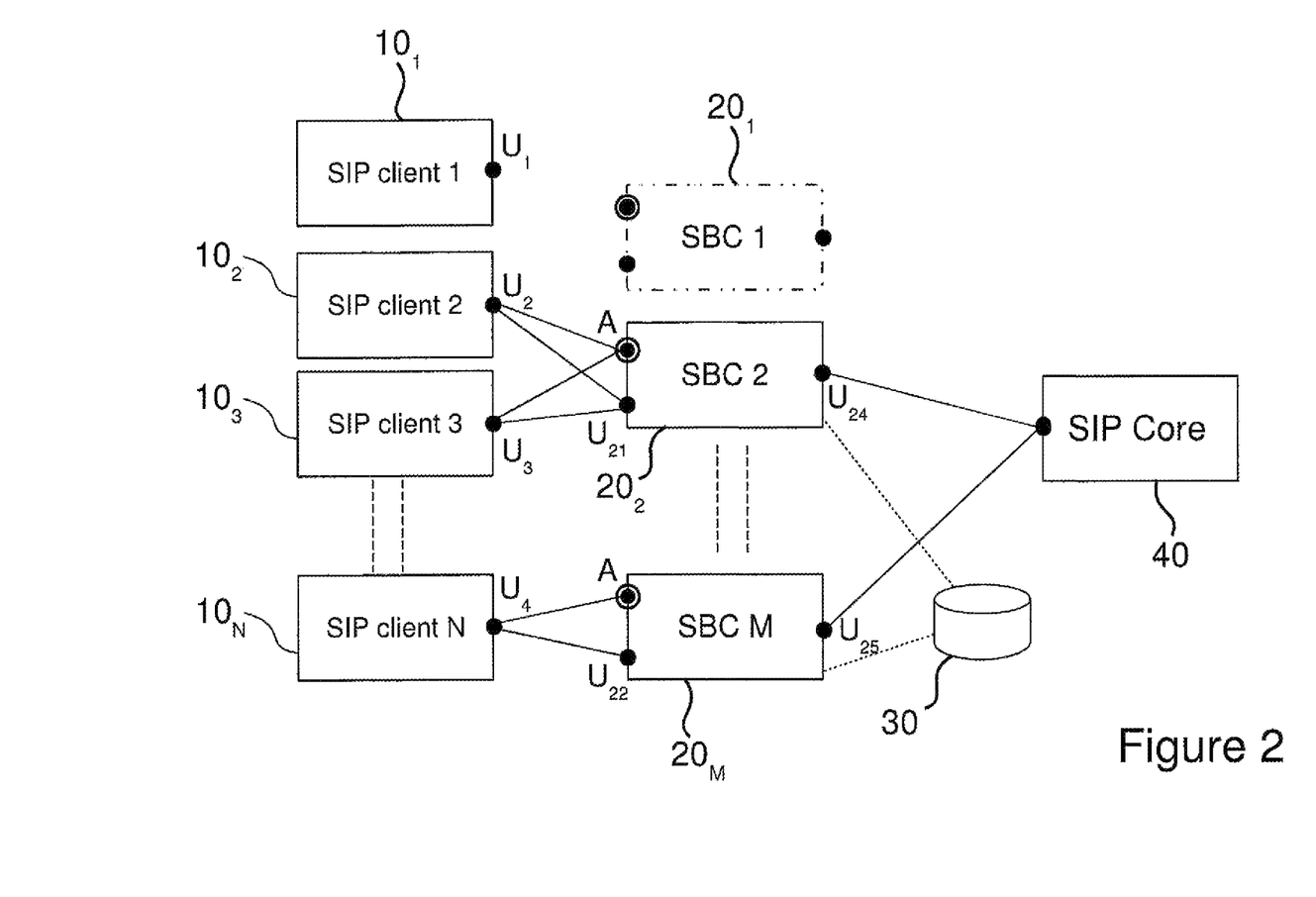
FIG. 2 shows the network of FIG. 1 after an SBC instance becomes unavailable.

As shown in FIG. 2, SBC $20_1$ has gone offline and has become unavailable. Consequently, it cannot receive packets sent from SIP client $10_1$. The unavailability of SBC $20_1$ does not necessarily affect the operation of the other SIP clients. As shown in FIG. 2, these will continue to route their calls through the same SBCs as before, unless a network topology change or some other effect prevents this.

Following the failure of SBC $20_1$, the anycast route to the SBC $20_1$ under address A is removed from the routing protocol so that packets are not sent across the network towards the network location SBC $20_1$, occupied before it failed. The removal of the SBC $20_1$ from the routing protocol may be performed by a network entity which polls one or more of the SBCs $20_1$-$20_M$ (e.g. on a periodic basis or an ad hoc basis); detects or confirms the failure of SBC $20_1$; and withdraws the route from the routing protocol. The packets originating from SIP client $10_1$, which are addressed to anycast address A, will now be routed to the next available instance of that address. In this example, this is SBC $20_2$, although this will depend on the actual network topology. Consequently, SBC $20_2$ will need to take ownership of the call.

Figure 3:
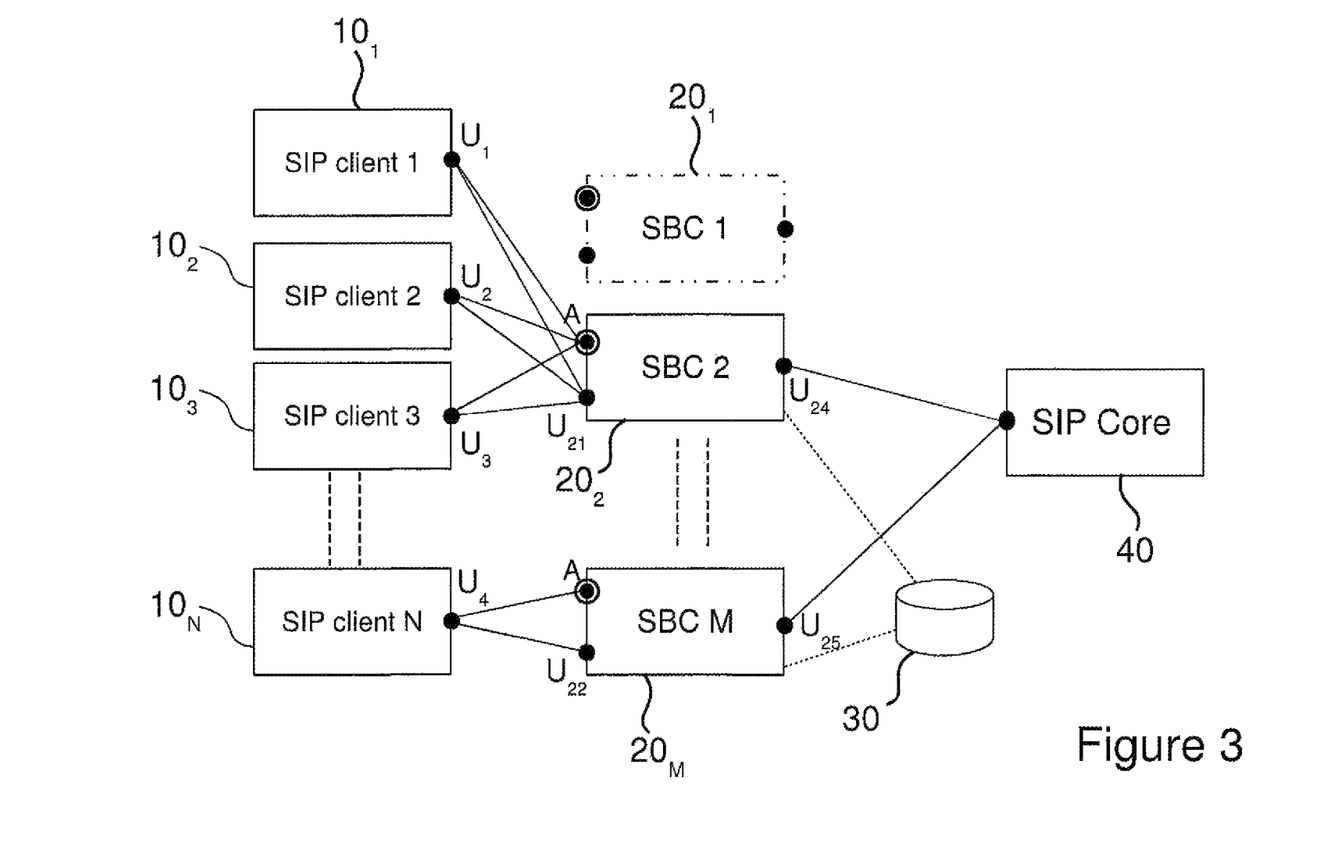
FIG. 3 shows the network after the system has reconfigured in response to the lack of availability of the SBC.

In practice, that means that SIP and RTP packets from the client $10_1$ will start turning up at the anycast interface of SBC $20_2$, as shown in FIG. 3. As the unavailability of SBC $20_1$ is not expected, there may be no warning and SBC $20_2$ will not be aware or expecting packets from SIP client $10_1$. In fact, which alternative SBC the packets from SIP client $10_1$ arrive at will depend on the topology of the network at the time, and the packets could well be received by a different SBC.

The SBCs are therefore required to handle packets that arrive from a client which they are not currently handling a call for and so are not expected. When an unexpected IP packet arrives like this, from a hitherto unknown client/call, the SBC responds by receiving the packet and then begins the process of taking over the handling of the call. The SBC may include a call manager, which may perform this takeover process and other actions related to handling and managing calls and data packets.

One step of the takeover process is for SBC $20_2$ to obtain information about the call. SBC $20_2$ therefore requests the information about the call from the store 30, using the IP address of the client from which the unexpected packet has been received to identify the call among the calls whose information is stored in the shared store 30. On receiving the information about the call, the SBC may update its local record of calls for which it is responsible to include the call corresponding to the received unexpected packet.

Another step of the takeover process is for SBC $20_2$ to initiate a re-INVITE message from the interface labelled $U_{24}$ towards the SIP core, to ensure that the call's signalling and media channels coming from the core side are transferred to its own core-facing unicast address $U_{24}$. In other words, packets coming from the recipient of the call, via the SIP core 40, will be directed to address $U_{24}$ of SBC $20_2$ rather than to address $U_{23}$ of SBC $20_1$.

Another step of the takeover process is for SBC $20_2$ to assert its ownership of the call internally among the SBC cluster ($20_1$-$20_M$), i.e. to inform the other SBCs in the cluster of its intention to take over responsibility for the call. In the illustrated embodiment, SBC $20_2$ achieves this by updating the record relating to the call in the store 30, so that the other SBCs are able to determine, on reading the data stored in the store 30, that the call has been re-assigned to SBC $20_2$. In particular, this means that if the original SBC $20_1$ is still up, it can gracefully clean up its local call state rather than relying on a timeout (which would be treated as an abnormal call termination), and update its view of which clients it is responsible for (e.g. update a local record of the calls for which the SBC $20_1$ is responsible). This is particularly important where SBC $20_1$ is still up and connected to the network but the network topology has caused the change of where the anycast address for SIP client $10_1$ is directed. If SBC $20_1$ is offline then this is less of an issue.

Updating the record relating to the call in the store 30 may be achieved by sending a message or otherwise providing an indication to the store 30 including instructions to the store 30 to update the record to reflect SBC $20_2$'s intention to take over responsibility for the call. The store 30 may record the SBC that is responsible for a call using a simple field in which the identity of the SBC (e.g. "SBC $20_1$" or simply "$20_1$") is recorded. In such cases, updating the record to reflect SBC $20_2$'s intention to take over responsibility for the call may involve overwriting or deleting whatever data is in the field (e.g. "SBC $20_1$" in the above example) and replacing it with data identifying the SBC which intends to take over responsibility for the call ("SBC $20_2$" in the above example).

In some embodiments, the takeover process may also include SBC $20_2$ informing other participants in a call of the fact that it has taken over responsibility for the call. This may be necessary if the other participants need, for example, to exchange packets with the SBC $20_2$ using a unicast address of the SBC $20_2$.

Whether or not some or all of these steps are carried out, the order of the steps, and the relative timing of the steps may be varied depending on the particular implementation. It may for example be that an SBC, on receiving an unexpected packet, immediately completes some or all of the steps, and assumes responsibility for the call immediately. Alternatively, the SBC may await a reply to one or more of its actions. It may for instance await a reply from the SIP core 40 indicating that all packets relating to the call will be forwarded to the SBC before updating the store 30 to inform the other SBCs of the SBC's intention to take over responsibility for the call. Depending on the nature of the store 30, the SBC may await confirmation from the store 30 that the record relating to the call has been updated before updating its local record of calls for which it is responsible. Additionally or alternatively the SBC may await acknowledgement(s) of its intention to assume responsibility for the call from one or more of the other SBCs.

The SBC to which a packet is routed is dependent upon network topology, as indicated above. However, where a SIP client is close to the notional boundary between two SBCs' coverage, it is possible that the routing is such that some packets may be routed to one SBC instance initially but a small change in the network environment may mean that packets are subsequently routed to a different SBC. This change may subsequently revert, so that packets again go to the first SBC. This "route flap" may cause packets to be intermittently directed to different SBCs until the route stabilises and the packets are reliably delivered to only one SBC.

This switching between SBCs may cause the respective SBCs to attempt to both take over the same call. This in turn could lead to multiple re-INVITE messages being sent to the SIP core 40. This could lead to processing avalanches with temporary periods of high load on components within the system, which is undesirable.

To deal with this phenomenon, a modified embodiment utilises a controlled take over process, as described below. In the example shown in FIG. 1, SIP client $10_1$ is initially routing a call through SBC $20_1$, which "owns" the call. However, a change in the network means that packets sent from SIP client $10_1$ are routed to SBC $20_2$.

As described above, when SBC $20_2$ receives the packet from SIP client $10_1$, it determines that it is not currently handling the call which this packet relates to. It must therefore consider taking over ownership of the call. However, rather than immediately taking over responsibility, SBC $20_2$ registers itself as a candidate in the shared cluster data in the store 30. SBC $20_2$ may for instance update the call record in the store 30 so that the field identifying the SBC responsible for the call indicates that "SBC $20_2$" is responsible. Alternatively, SBC $20_2$ may update the call record in the store 30 to include SBC $20_2$ in a list of SBCs that are available to take over the call. Depending on its configuration, the SBC $20_2$ might at this point add the call to the internal record of calls which SBC $20_2$ is handling, even though it has not yet formally taken over the call. This may provide a back-up system for ensuring that the call is not left without an owning SBC at a later time. The SBC may be triggered by the presence of the call in the internal record of calls to check the store 30 at a later time to determine whether or not any other SBC has taken responsibility for the call. Alternatively, an SBC might only add the call to the internal list of calls for which that SBC is responsible when it has formally taken over the call (e.g. by issuing a re-INVITE message to the SIP core, and/or by updating the store 30 to indicate that it is the SBC responsible for the call).

When the SBC $20_2$ updates the call record in the store 30 to include itself in the "responsible" field or the list of SBCs that are available to take over the call, a timer is started at the SBC $20_2$. The timer provides a period of time in which other SBCs may try to register themselves as candidates for taking over the call. The timer period may for example be a number of milliseconds or a number of whole seconds. As will be explained in more detail below, while the time period is elapsing, other SBCs might update the call record in the store 30 to add themselves to the list of candidate SBCs for taking over the call or to record their identifiers in the "responsible" field. When updating the call record to include itself in the list of candidate SBCs for taking over the call, an SBC may include a timestamp showing when that SBC received the packet that prompted the updating of the call record, or when the SBC updated the call record to include itself in the list of candidates.

If at the end of SBC $20_2$'s timer period there is no competition for the call (i.e. no other SBC has added itself to the list of candidates for taking over the call or replaced "SBC $20_2$" in the "responsible" field with a different identifier since SBC $20_2$'s timer was started), SBC $20_2$ knows that it is the sole registrant and can take over the call. If it has not already done so, it updates the call record at the store 30 to show that it (SBC $20_2$) owns/is responsible for the call, and issues a re-INVITE message to the SIP core 40 so that packets relating to the call are forwarded by the SIP core 40 to the SBC $20_2$. It may also update its own internal record of the calls it is handling to include the call, depending on whether it has already done this (see above).

In the example shown in FIG. 2, where SBC $20_1$ goes offline, SBC $20_1$ will not receive any packets and so will not attempt to register itself as a candidate for taking over the call. Consequently, when SBC $20_2$ receives a packet from client $10_1$, and updates the call record to register its availability to take over the call, SBC $20_2$'s timer will start and then run its course with no other registration attempts, allowing SBC $20_2$ to take over the call, as described above.

However, if there is competition for the call and more than one SBC updates the call record to register its availability to take over the call, steps are taken to manage the competition for the call. For example, if a call is initially registered with SBC $20_1$ but it goes offline, then packets start to be redirected. Initially, a packet is directed to SBC $20_2$, and so SBC $20_2$ begins the process to register to take over ownership of the call (i.e. at least updates the call record at the store 30 to add itself to the list of candidate SBCs for taking over the call or record itself in the "responsible" field). As before a timer will be started at SBC $20_2$. However, whilst the timer at SBC $20_2$ is running, the network routes a packet from the SIP client to a different SBC, SBC $20_M$. Upon receipt of this packet, SBC $20_M$ also begins the process of taking over the call and registers with the store 30 by updating the call record associated with the call to include the SBC $20_M$ as a candidate for taking over responsibility for the call or replacing "SBC $20_2$" in the "responsible" field with "SBC $20_M$". If applicable, the store 30 may preserve the order in which different SBCs add themselves to the list of candidate SBCs, and, as mentioned above, may be arranged to allow SBCs to include timestamps when adding themselves to the list.

When SBC $20_M$ updates the call record to register its availability to take over the call, another timer is started, this time at SBC $20_M$. The period of the timer at SBC $20_M$ may be the same as the period of the timer at SBC $20_2$, so that the timer behaviour of the SBCs is the same. Alternatively, the SBCs may have different timer periods, allowing a hierarchy of "preferred" SBCs to be established, as discussed in more detail below.

No further packets from the client are received at SBC $20_2$. At the end of SBC $20_2$'s timer period, SBC $20_2$ reads the call record at the store 30 and establishes that (in this example) another SBC (SBC $20_M$) received a packet from the client after SBC $20_2$'s timer was started. SBC $20_2$ may, depending on the implementation of the store 30 and of the SBCs, establish this fact on the basis of the timestamps associated with packets received by the candidate SBCs, and/or on the basis that the SBC $20_2$ is not the most recent SBC to update the store 30 (e.g. the "responsible" field no longer says "SBC $20_2$"). SBC $20_2$ therefore takes no further action.

At the end of SBC $20_M$'s timer period, SBC $20_M$ reads the call record at the store 30 and establishes that (in this example) no other SBC has received a packet from the client since SBC $20_M$'s timer was started. SBC $20_M$ is the SBC which most recently received a packet from the client. As with SBC $20_2$, this conclusion may be based on the timestamps at the store 30 and/or on the fact that SBC $20_M$ was the SBC which most recently updated the store 30.

SBC $20_M$ therefore updates the call record at the store 30 to show that it (SBC $20_M$) owns/is responsible for the call (if it has not already done so). It may also update its own internal list of calls for which it is responsible to include the call, depending on whether this has already been done. The SBC $20_M$ additionally sends a notification to the SIP core (and possibly to the other participants in the call) to indicate that SBC $20_M$ is now the SBC responsible for the call, to ensure further packets relating the call are sent to SBC $20_M$. The notification may contain updated SDP information. The notification may take the form of a SIP message such as a SIP "INVITE" request, response or "ACK"; a SIP "UPDATE" request or response; or a SIP "180" message.

In this way, an SBC cannot take over a call until a predefined period of time has elapsed in which other SBCs can register their availability as candidate SBCs for call ownership/responsibility. This can provide a degree of damping before call take over, to avoid ownership flapping between SBCs. For example, the SBCs may be arranged such that a re-INVITE message will be sent out only once an SBC has taken over ownership of the call, so a single call will not generate multiple re-INVITE messages in quick succession, i.e. an avalanche of such messages will be prevented.

Whilst the duration of the timer will introduce a small delay before a call is taken over, this should not significantly affect the call as the timer duration can be sufficiently small to prevent significant interruption to the call in stable routing situations whilst still preventing the avalanche effect in unstable routing situations.

The above example is an effective way of controlling the takeover of a call, but other techniques may be used to control access and/or mitigate route flap. For example, ownership requests may be weighted or the timer periods varied based on a number of factors such as historical relationship between a client and an SBC or the SBC and a competing SBC. The timer interval may be varied according to network conditions such as traffic levels and so on. The timer duration may also be selected to balance failover times to switch between SBCs and stability in terms of acceptable flapping of the SBCs.

The selection of the winner may also be modified. In some examples, an entire timer period of a first SBC must elapse without any other SBC receiving a packet from the client in order for the first SBC to be able to take over the call. This is a relatively strict criterion. In other examples (e.g. examples where a large number of packets are received by one or more SBCs during the timer period), it may be that an SBC takes over a call if it receives more than a certain percentage of the total number of packets received by it and the other SBCs in its timer period. Thus, in these examples, an SBC maintains a tally (locally or at the store by updating the store each time it receives another packet, for example) of how many packets it has received. Alternatively, there may be no recording of a tally of packets. An SBC might update the store only once in its timer period, regardless of how many packets it receives from the client beyond the first packet from the client.

In some embodiments, an SBC's timer period might elapse whether or not that SBC receives further packets in its timer period. In other embodiments, the timer period may start again each time a new packet is received, depending on the particular configuration of the system.

Other steps may be taken if there is repeated contention for the ownership of a call. For example, if ownership of a call is requested more than a certain number of times, then further steps may be taken, such as to award the call randomly to one of the contenders or to vary the timer period etc.

The selection of the network layout may also be used to prevent competition for taking over a call. SBCs with the same anycast address which are topologically located a long network distance away from each other are less likely to cause flap. By allocating multiple anycast addresses to a SIP service and splitting the clients evenly among the set of anycast addresses, and locating the servers hosting the anycast addresses far apart, the effect of flap can be diminished.

Although in the embodiments above the timer(s) were at the SBC(s), in other embodiments, the store 30 may be arranged so that it has enhanced functionality and can perform other functions as well as storing data, and one or more timers may operate at the store 30. In such embodiments, the store 30 may be arranged to determine which SBC should take ownership of/responsibility for a call. The store 30 may inform the SBC(s) of the outcome of its determination by sending one or more messages to the SBC(s). The store 30 may for example send an authorising message or signal to one of the SBCs to inform the SBC that it has authority to take over the call. In such cases, the store 30 may take responsibility for informing the SIP core 40 that packets relating to the call should be directed to the new SBC. Alternatively, the new SBC may perform this step itself.

As described above, while the store 30 may in some embodiments include a list of candidate SBCs which are available for taking over responsibility for a call, in other embodiments the store 30 may simply record which SBC is responsible for a call in a field which records, for example, an identifier of the SBC (e.g. "SBC $20_1$" or "$20_1$"). In such embodiments, the store 30 may not include a list of candidate SBCs. The candidate SBCs can instead write their identifiers to the field, possibly overwriting an identifier already in the field. If at the end of a first SBC's timer period the first SBC reads the field and determines that its identifier is not in the field (i.e. the first SBC's identifier has been overwritten or deleted and replaced with a second SBC's identifier), the first SBC knows that it is not responsible for the call.

In the above embodiments, the SBCs use the IP source address of the SIP clients to recognise a call which it is not currently handling and to trigger call takeover. In the absence of any measures to prevent it, an unscrupulous party or "spoofer" wishing to take over the call might try to induce its nearest SBC to take over calls or imitate clients that it is not meant to own. IP spoofing is commonly used in denial of service attacks. For example, a spoofer could attempt to imitate the IP address $U_1$ of SIP client $10_1$ by falsely labelling packets as coming from the address $U_1$ of SIP client $10_1$.

Similarly, by simply looping through all possible IP addresses sequentially, a malicious host program could try to induce the nearest SBC to try to arbitrarily take over calls being handled by the cluster. Packets could be repeatedly sent with random IP addresses in the hope of eventually identifying a valid IP address such as $U_1$.

In either case, if for example SBC $20_M$ received a packet purportedly from SIP client $10_1$'s IP address $U_1$, then SBC $20_M$ would validly assume that packets from SIP client $10_1$ were being rerouted to its anycast interface and take steps to register to take over the call. However, SIP client $10_1$ would still be sending packets to be received by SBC $20_1$, as normal. This would then cause SBC $20_1$ to try to reregister itself as handling the call. This could create a permanent contention situation between SBC $20_M$ and the correct SBC $20_1$ for a given IP address. It will be apparent that a large number of such malicious host programs deployed at clients around the network could severely disrupt or bring down the service.

Measures may be included to prevent such a situation. In one example, uRPF (Unicast Reverse Path Forwarding) is deployed at access routers. Any SBC interface that connects to a network segment where uRPF is universally deployed can be considered safe from source spoofing.

Alternatively, secure RTP (SRTP) may be used to authenticate a received RTP packet. This would allow spoofed packets to be identified and discarded. With this arrangement, an SBC instance receiving an IP packet would retrieve the RTP flow record, including SRTP credentials from the shared cluster data in store 30, and authenticate the packet against them. Only if the packet is successfully authenticated will the SBC take over the call.

A further option is to use IP security (IPsec) to authenticate a packet source. This again allows spoofed packets to be identified and discarded, preventing unauthenticated access to the SBC.

In the examples above, the SBCs have at least one anycast interface. The SBCs are shown as having separate unicast interfaces (with addresses $U_{20}$, $U_{21}$ and $U_{22}$) on the client side which may be used when they are communicating with the SIP clients and the SBC is the UAC for the transaction. The SBCs may have other unicast interfaces.

The store 30 may be more than a simple store of data and may have a management function to control the ownership of calls and manage the timers and requests from the SBCs. The store may be separate from the SBCs or may be hosted by one of the SBCs. The information in the core may be replicated to provide redundancy. The core may communicate with the SBCs over the same network as the other packets or over a separate network.

In some of the examples discussed above, the store 30 may hold call information as well as timers. The store 30 may be divided into two or more parts, which may be physically separate, with each managing one of the call data and timer management tasks. The store 30 may be part of the core 40.

The examples above are described as calls but may refer to any kind of media communication session, particularly those set up using Session Initiation Protocol (SIP) and where media packets are carried using Real-time Transport Protocol (RTP) or variants such as sRTP. It may relate to calls in which media packets are delivered, using RTP or other transfer protocols, to anycast addresses.

What is claimed is:

1. A media forwarding device for handling media communication sessions, said media forwarding device being arranged to have an associated anycast address which is arranged to be shared with one or more other media forwarding devices and which anycast address is arranged for receiving packets from one or more clients; wherein the media forwarding device includes:
   a call manager, implemented either as hardware or as software stored on a non-transitory medium and executable by a processor, for managing one or more media communication sessions handled by said media forwarding device, wherein the call manager is arranged to:
   determine if a received packet relates to one of said one or more media communication sessions handled by said media forwarding device; and
   if a received packet does not relate to one of said one or more media communication sessions, obtain session information regarding the session corresponding to said received packet and send an update message indicating that said media forwarding device intends to handle the session corresponding to the received packet.

2. A media forwarding device according to claim 1, wherein said call manager is further arranged to send a notification to one or more other devices involved in the session corresponding to the received packet.

3. A media forwarding device according to claim 2, wherein said notification is a session initiation protocol message indicating that packets relating to the session corresponding to the received packet should be directed to said media forwarding device.

4. A media forwarding device according to claim 1, wherein said call manager is arranged to update information about said one or more media communication sessions to include said session corresponding to the received packet, if said call manager determines that said received packet does not relate to one of said one or more media communication sessions handled by said media forwarding device.

5. A media forwarding device according to claim 1, wherein said call manager is arranged to update information about said one or more media communication sessions to include said session corresponding to the received packet, when a period of time has elapsed and during the period of time no other media forwarding device arranged to have the shared anycast address has received a further packet corresponding to the session corresponding to said received packet.

6. A system comprising a plurality of media forwarding devices according to claim 1, and
   a data store for storing session information about media communication sessions managed by said plurality of media forwarding devices, said data store being arranged to provide session information about one or more of the media communication sessions in response to a request from one of said media forwarding devices and to update the session information in the data store in response to an update message received from one of said media forwarding devices.

7. A method for controlling a media forwarding device, said method comprising:
   managing one or more media communication sessions;
   receiving packets from one or more clients via an anycast address associated with the media forwarding device, wherein said anycast address is shared with one or more other media forwarding devices;
   determining if a received packet relates to one of said managed media communication sessions; and
   if a received packet does not relate to one of said managed media communication sessions:
      obtaining session information regarding the session corresponding to said received packet; and
      sending an update message indicating that said media forwarding device intends to handle the session corresponding to the received packet.

8. A method according to claim 7, further comprising sending a notification to one or more other devices involved in the session corresponding to the received packet.

9. A method according to claim 8, wherein said notification is a session initiation protocol message indicating that packets relating to the session corresponding to the received packet should be directed to said media forwarding device.

10. A method according to claim 7, further comprising updating information about said managed media communication sessions to include said session corresponding to the received packet, if it is determined that said session corresponding to the received packet does not relate to one of said managed media communication sessions.

11. A method according to claim 7, further comprising updating information about said managed media communication sessions to include said session corresponding to the received packet, when a period of time has elapsed and during the period of time no other media forwarding device arranged to have the shared anycast address has received a further packet corresponding to the session corresponding to said received packet.

12. A method for controlling a system comprising a plurality of media forwarding devices and a data store, incorporating the method of claim 7, further comprising:

storing, in a data store, session information about media communication sessions managed by the plurality of media forwarding devices, said plurality of media forwarding devices including said media forwarding device and one or more other media forwarding devices, and
providing session information about one or more of the media communication sessions in response to a request from one of said media forwarding devices, and
updating the session information in the data store in response to an update message received from one of said media forwarding devices.

13. A non-transitory computer-readable storage medium encoded with instructions which, when executed by a processor, enable a media forwarding device to perform steps comprising:
   managing one or more media communication sessions;
   receiving packets from one or more clients via an anycast address associated with the media forwarding device, wherein said anycast address is shared with one or more other media forwarding devices;
   determining if a received packet relates to one of said managed media communication sessions; and
   if a received packet does not relate to one of said managed media communication sessions:
      obtaining session information regarding the session corresponding to said received packet; and
      sending an update message indicating that said media forwarding device intends to handle the session corresponding to the received packet.

14. A non-transitory computer-readable storage medium as claimed in claim 13, encoded with further instructions for causing the media forwarding device to send a notification to one or more other devices involved in the session corresponding to the received packet.

15. A non-transitory computer-readable storage medium as claimed in claim 14, wherein said notification is a session initiation protocol message indicating that packets relating to the session corresponding to the received packet should be directed to said media forwarding device.

16. A non-transitory computer-readable storage medium as claimed in claim 13, encoded with further instructions for causing the media forwarding device to update information about said managed media communication sessions to include said session corresponding to the received packet, if it is determined that said session corresponding to the received packet does not relate to one of said managed media communication sessions.

17. A non-transitory computer-readable storage medium as claimed in claim 13, encoded with further instructions for causing the media forwarding device to update information about said managed media communication sessions to include said session corresponding to the received packet, when a period of time has elapsed and during the period of time no other media forwarding device arranged to have the shared anycast address has received a further packet corresponding to the session corresponding to said received packet.

* * * * *